United States Patent [19]
Kienle et al.

[11] Patent Number: 5,913,301
[45] Date of Patent: Jun. 22, 1999

[54] PROTECTION SYSTEM FOR A TURBOCHARGED INTERNAL COMBUSTION ENGINE

[75] Inventors: Karin Kienle, Weil Der Stadt; Michael Baeuerle, Markgröningen, both of Germany

[73] Assignee: Robert Bosch GmbH, Stuttgart, Germany

[21] Appl. No.: 08/793,656

[22] PCT Filed: Aug. 23, 1995

[86] PCT No.: PCT/DE95/01114

§ 371 Date: Feb. 26, 1997

§ 102(e) Date: Feb. 26, 1997

[87] PCT Pub. No.: WO96/10128

PCT Pub. Date: Apr. 4, 1996

[30] Foreign Application Priority Data

Sep. 28, 1994 [DE] Germany .............................. 44 34 607

[51] Int. Cl.$^6$ .............................. F02D 23/02; F02D 41/22
[52] U.S. Cl. .............................................. 123/481; 60/603
[58] Field of Search ................. 123/198 F, 481; 60/605.1, 603

[56] References Cited

U.S. PATENT DOCUMENTS

| | | |
|---|---|---|
| 4,470,390 | 9/1984 | Omori et al. . |
| 4,603,552 | 8/1986 | Kido ........................................ 60/605.1 |
| 5,105,779 | 4/1992 | Thompson ........................... 123/198 F |
| 5,299,423 | 4/1994 | Shiozawa et al. . |
| 5,502,966 | 4/1996 | Unland et al. ....................... 123/198 F |

FOREIGN PATENT DOCUMENTS

| | | |
|---|---|---|
| 43 10 261 | 10/1994 | Germany . |
| 57-193736 | 11/1982 | Japan . |
| 60-6029 | 1/1985 | Japan . |
| 61-265331 | 11/1986 | Japan . |

*Primary Examiner*—Michael Koczo
*Attorney, Agent, or Firm*—Kenyon & Kenyon

[57] ABSTRACT

With a protection system for a turbocharged internal combustion engine, it is determined, using a parameter characterizing the turbocharging, whether an overshoot or a serious defect, such as for example a hose failure, is present in the turbocharging pressure system and, according to the case, a 1st or 2nd suppression pattern for suppressing fuel injection to individual cylinders is activated. In the event of repeat occurrences, the protection system according to the invention responds considerably faster than in the first occurrence of the defect. An error correction is possible under certain operating conditions, and the original response time is restored.

14 Claims, 6 Drawing Sheets

5,913,301

PROTECTION SYSTEM FOR A TURBOCHARGED INTERNAL COMBUSTION ENGINE

FIELD OF THE INVENTION

The present invention relates to a protection system for a turbocharged internal combustion engine.

BACKGROUND INFORMATION

A conventional protection system is described in German Patent No. 43 10 261. (not a prior art publication), where intervention in the open and/or closed loop control of the turbocharging of the internal combustion engine takes place during a first supercharging (excessive) stage and fuel delivery to the individual cylinders is interrupted following a predefined suppression pattern during a second supercharging (excessive) stage. This pattern may be successively modified to other suppression patterns with a higher suppression frequency.

In a turbocharged internal combustion engine described in U.S. Pat. No. 4,470,390, cylinder injection suppression is performed according to a certain pattern as a function of a plurality of turbocharging thresholds in order to protect the engine from being destroyed by supercharging.

U.S. Pat. No. 5,299,423 describes a process for adjusting the throttle valve as a function of the turbocharge pressure to avoid excessive turbocharge pressure and protect the engine.

The object of the present invention is to ensure optimum protection of the turbocharged internal combustion engine.

SUMMARY OF THE INVENTION

Contrary to the conventional systems, no direct intervention in the turbocharge (or normal supercharge) control takes place in the present invention. Furthermore, the invention provides quicker triggering of the protective measures in the case of repeated supercharging than in a one-time occurrence, i.e., the response times of the protection system according to the present invention are modified. Furthermore, the present invention makes a distinction between a supercharge condition caused, for example, by an overshoot of the turbocharge pressure control circuit and a supercharge condition caused by a serious defect, for example, a loose hose connection. Another difference between the invention and the related art consists of the fact that under predefinable operating conditions, any functions activated as a result of a one-time or repeated supercharge condition are de-activated again, setting the modified response times to their original values.

Advantages of the Invention

The present invention is advantageous in that it allows optimum protection of a turbocharged internal combustion engine from a supercharge damage. In the protection system according to the present invention, injection to individual cylinders of the internal combustion engine is suppressed by a predefinable first suppression pattern if a parameter that characterizes the turbocharging meets a predefinable first activation condition. Furthermore, injection to individual cylinders of the internal combustion engine is suppressed according to a predefinable second suppression pattern if a parameter that characterizes the turbocharging meets a predefinable second activation condition. If the first activation condition occurs repeatedly, the first activation condition is modified, and if the second activation condition occurs repeatedly, the first and second activation conditions are modified. This has the advantage that, if the activation conditions occur for the first time, these activation conditions may be configured so that accidental cylinder suppression cannot occur, with the result that a certain period of time elapses before cylinder suppression is activated. In order to protect the internal combustion engine, however, if cylinder suppression is needed more frequently, the first time period does not have to elapse every time before suppression is activated. Therefore it is advantageous to modify the activation condition after the first occurrence.

Instead of cylinder injection suppression, intervention in the throttle valve position can also be used. The suppression patterns used are then replaced with two interventions of different intensities in the throttle valve position.

DETAILED DESCRIPTION OF THE INVENTION

The protection system according to the present invention is described below with reference to the embodiments, where the turbocharging (or normal supercharging) of the internal combustion engine is characterized by turbocharge pressure P. The present invention, is not limited to an application as described herein. The turbocharging of the internal combustion engine can also be characterized, for example, by the intake air mass or volume mL. In the embodiments described, the turbocharge pressure P would then be replaced by one of these parameters.

Figure 1:
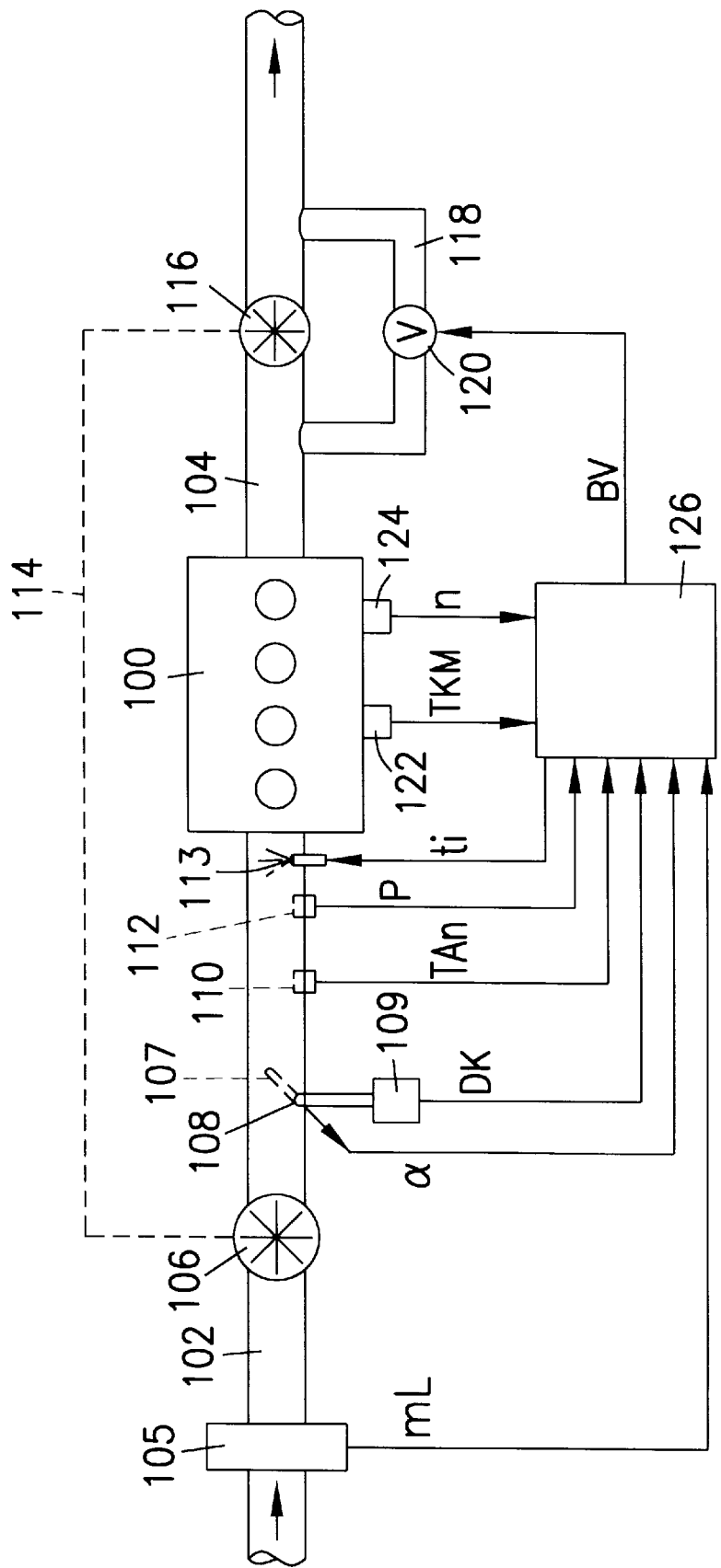
FIG. 1 shows a schematic representation of a turbocharged internal combustion engine.

FIG. 1 shows an internal combustion engine 100, supplied with an air/fuel mixture through intake line 102 and whose exhaust gases are evacuated into an exhaust line 104. Viewed in the direction of the air intake, an air flow meter or air mass meter 105, for example, a hot film air mass meter, a compressor 106, a throttle valve 107 with a sensor 108 to measure the aperture angle of valve 107 and a drive 109 to actuate the throttle valve, a temperature sensor 110 to measure the intake air temperature, a pressure sensor 112 to measure the turbocharge pressure, and at least one injection nozzle 113 are provided in intake line 102. A turbine 116, which drives compressor 106 via coupling means 114, is provided in exhaust line 104. A bypass line 118 bypasses turbine 116. A bypass valve 120 is provided in bypass line 118. A temperature sensor 122 to measure the temperature of the internal combustion engine and a speed sensor 124 are provided on internal combustion engine 100.

Output signals mL of the air flow meter or air mass meter 105, α of sensor 108 for measuring the angle of aperture of throttle valve 107, TAn of temperature sensor 110, P of pressure sensor 112, TKM of temperature sensor 122 and n of speed sensor 124 are supplied to a central controller 126 via appropriate connecting conductors. Controller 126 analyzes the sensor signals and activates, via other conductors, drive 109 of throttle valve 107, the injection nozzle(s) 113, and bypass valve 120.

Figure 2:
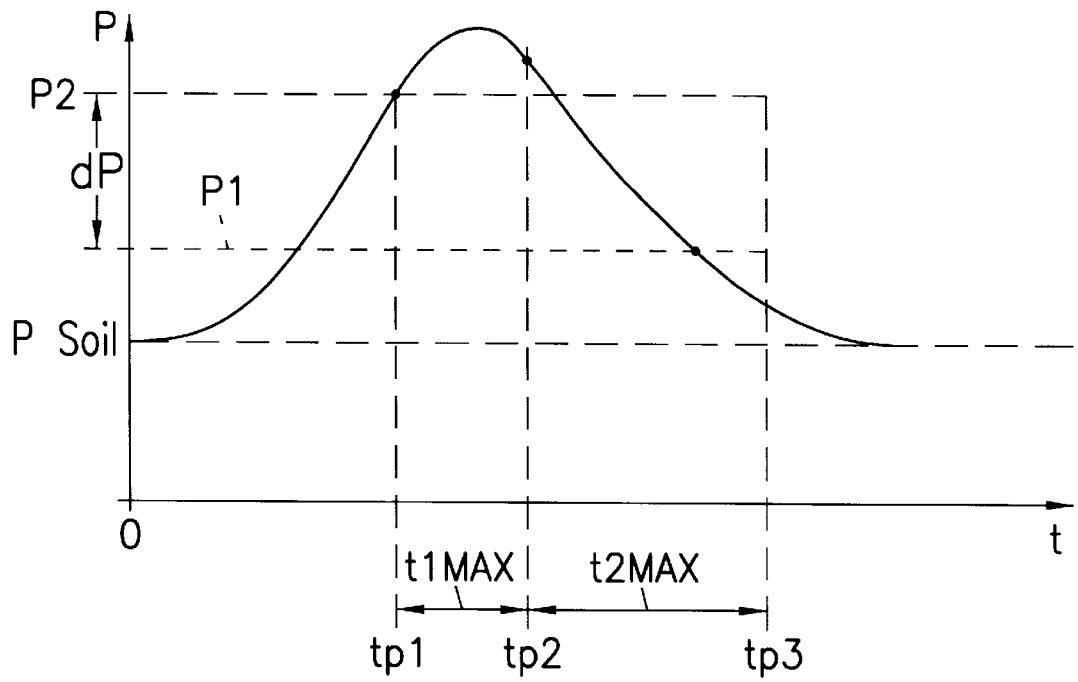
FIG. 2 shows a diagram of a variation of the parameters that characterize the turbocharging when only the first activation condition is met.

FIG. 2 shows a diagram of the variation over time of turbocharge pressure P, representing the turbocharging of internal combustion engine 100. The abscissas represent time t and the ordinates represent turbocharging pressure P. Turbocharging pressure P is initially near its setpoint PSoll and subsequently increases rapidly due to an overshoot. At time tp1, the turbocharge pressure P exceeds a predefinable activation threshold value P2, represented by a horizontal dashed line. Starting at time tp1, a first time interval t1Max is counted, which ends at time tp2. At time tp2, turbocharge pressure P is still greater than activation threshold P2. Therefore a first activation condition is met. The first activation condition stipulates the following: "turbocharge pressure P exceeds activation threshold P2 for at least a first time interval t1Max." This condition being met results in the injection being suppressed in individual cylinders according to a first suppression pattern starting at time tp2. In addition, the first activation condition is modified by removing waiting period t1Max, i.e., subsequently the first suppression pattern is activated immediately after the activation threshold P2 is exceeded. The first activation condition remains in this modified form until the original condition is reset. Such a reset is triggered when a reset condition to be described further below is met.

As a result of the injection suppression, the turbocharge pressure P quickly decreases in the example illustrated in FIG. 2 until it finally drops below a deactivation threshold value P1, which is represented with a broken horizontal line. When the turbocharge pressure drops below this deactivation threshold value P1, an interval t2Max, which begun at time tp2, has not yet elapsed. Time interval t2Max only ends at a later point in time tp3. When the turbocharge pressure drops below deactivation threshold value P1, the first suppression pattern is deactivated again, i.e., normal injection without suppression of individual cylinders is restored. Furthermore, with the turbocharge pressure dropping below the deactivation threshold value P1, the reset condition is met if the internal combustion engine 100 was running at a speed n greater than a threshold value in a full-load condition for a third time interval t3Max immediately before the turbocharge pressure dropped below the deactivation threshold value P1. Due to being thus reset to its original form, the variation of the turbocharge pressure P as represented in FIG. 2 does not result in the activation condition being modified. Since the first activation condition remains ultimately unmodified, the turbocharge pressure would have the same variation again under the same operating conditions.

Figure 3:
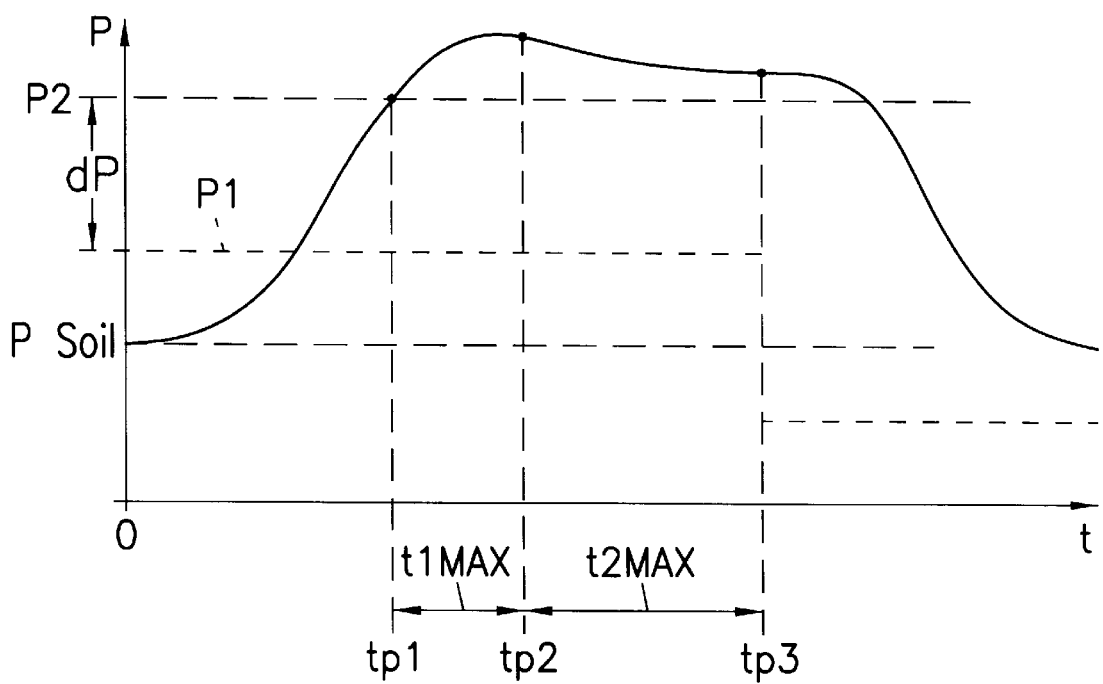
FIG. 3 shows a diagram of the variation of the parameters that characterize the turbocharging when the first activation condition is initially met, and subsequently when the second activation condition is once met.

FIG. 3, like FIG. 2, shows the variation of turbocharge pressure P, but under somewhat different operating conditions. In FIG. 3, turbocharge pressure P exceeds the activation threshold value P2 at time tp1. At time tp2, turbocharge pressure P is still greater than activation threshold value P2 and the first suppression pattern is activated as in FIG. 2, since the first activation condition is met. In addition, the first activation condition may be modified. Unlike in FIG. 2, the turbocharge pressure P is still greater than deactivation threshold value P1 at time tp3, i.e., after the end of time interval t2Max, and a second activation condition is met. The second activation condition is the following: "Turbocharge pressure P exceeds deactivation threshold value P1, after the first activation condition was met, for at least a second time interval t2Max." As a result, the second suppression pattern, having a higher suppression frequency than the first suppression pattern, is activated at time tp3. Furthermore, at time tp3, deactivation threshold value P1 has dropped, so that the second suppression pattern is deactivated only at a very low turbocharge pressure P. Finally, at time tp3, the second activation condition, which determines under what conditions the second suppression pattern is activated, is also modified. The second activation condition is modified so that there is no waiting during the second time interval t2Max, i.e., in the future the second suppression pattern is activated immediately after activation threshold value P2 is exceeded. Since for the variation of turbocharge pressure P as shown in FIG. 3 the turbocharge pressure no longer drops below deactivation threshold value P1, the first and second activation conditions are not reset. The effect of the change in the activation conditions is explained with reference to the variation of the turbocharge pressure P illustrated in FIG. 4.

Figure 4:
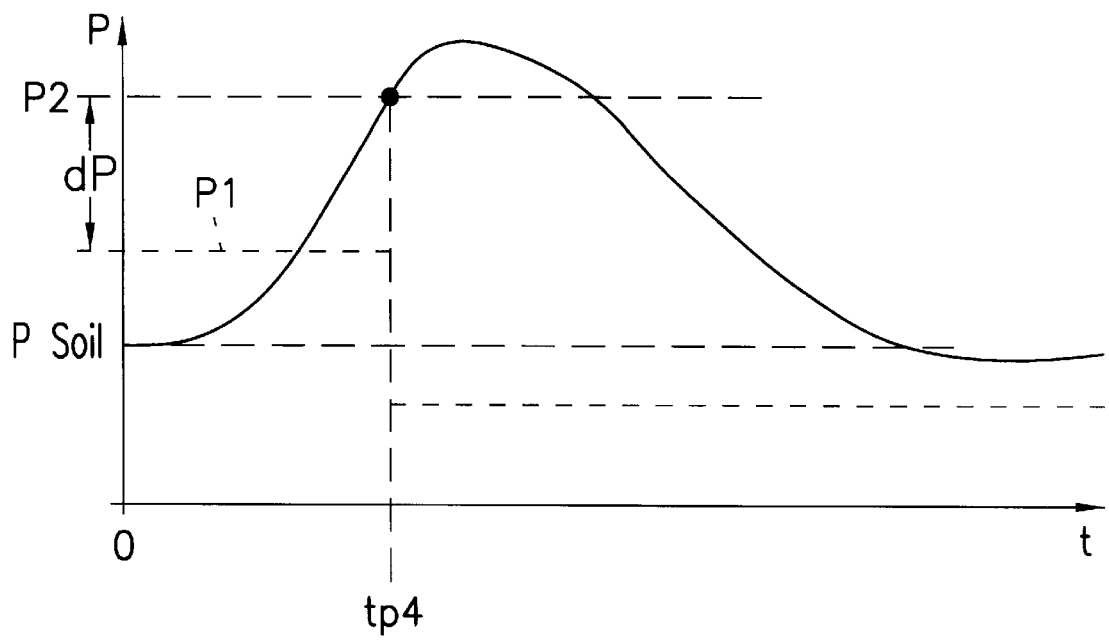
FIG. 4 shows a diagram of the variation of the parameters that characterize the turbocharging when the activation conditions are repeatedly met.

FIG. 4 shows a diagram of turbocharge pressure P when the activation conditions are modified, for example, as a result of a turbocharge pressure variation as shown in FIG. 3. At the beginning of the curve of turbocharge pressure P as shown in FIG. 4, neither the first nor the second suppression pattern is active, and therefore the deactivation threshold value P1 is not lowered. Turbocharge pressure P increases and at a time tp4 exceeds activation threshold value P2. The modified activation conditions result in the second suppression pattern being activated immediately at time tp4 and, at the same time, deactivation threshold value P1 is lowered. The activation conditions are reset to their original form when internal combustion engine 100 is operated at full load and above a speed threshold in without injection suppression, i.e., below deactivation threshold value P1 at least during a time interval t3Max.

Figure 5:
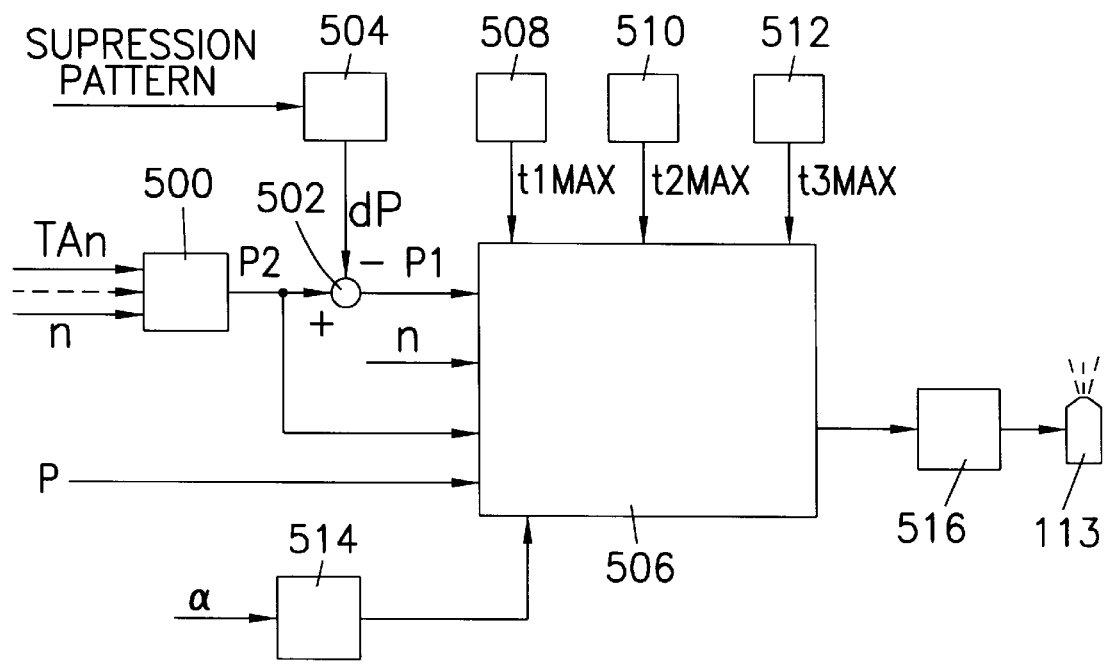
FIG. 5 shows a block diagram showing the protection system according to the invention.

FIG. 5 shows a block diagram of the protection system according to the invention. A table 500 determines the activation threshold value P2 from the intake air temperature TAn and speed n of the internal combustion engine 100, and makes the activation threshold value P2 available at the output of table 500. Table 500 can also be designed for other input parameters, for example, altitude information. This is indicated by a broken line. The output of table 500 is connected to a first input of a node 502. In node 502, a value dP, read from a curve 504, is subtracted from activation threshold value P2. Information on whether and when any individual suppression pattern is active is supplied to the input of curve 504. The result of the subtraction at node 502, the deactivation threshold value Pi, is forwarded to an input of a block (or a controller) 506. The activation threshold value P2, turbocharge pressure P, speed n, values for time intervals t1Max, t2Max, and t3Max, output by read-only memories 508, 510, and 512, and information output by block 514 on whether a full-load condition exists are applied to other inputs of block 506. A throttle valve aperture angle signal α, for example, or the output signal of a full-load switch can be applied to the input of block 514. According to the process represented by the flow diagram of FIGS. 6a–6c, block 506 determines whether intervention in the fuel delivery, i.e., activation of a suppression pattern, is required. If such an intervention is required, block 506 outputs a corresponding signal to a block 516, which activates injection nozzle(s) 113.

Figure 6A:
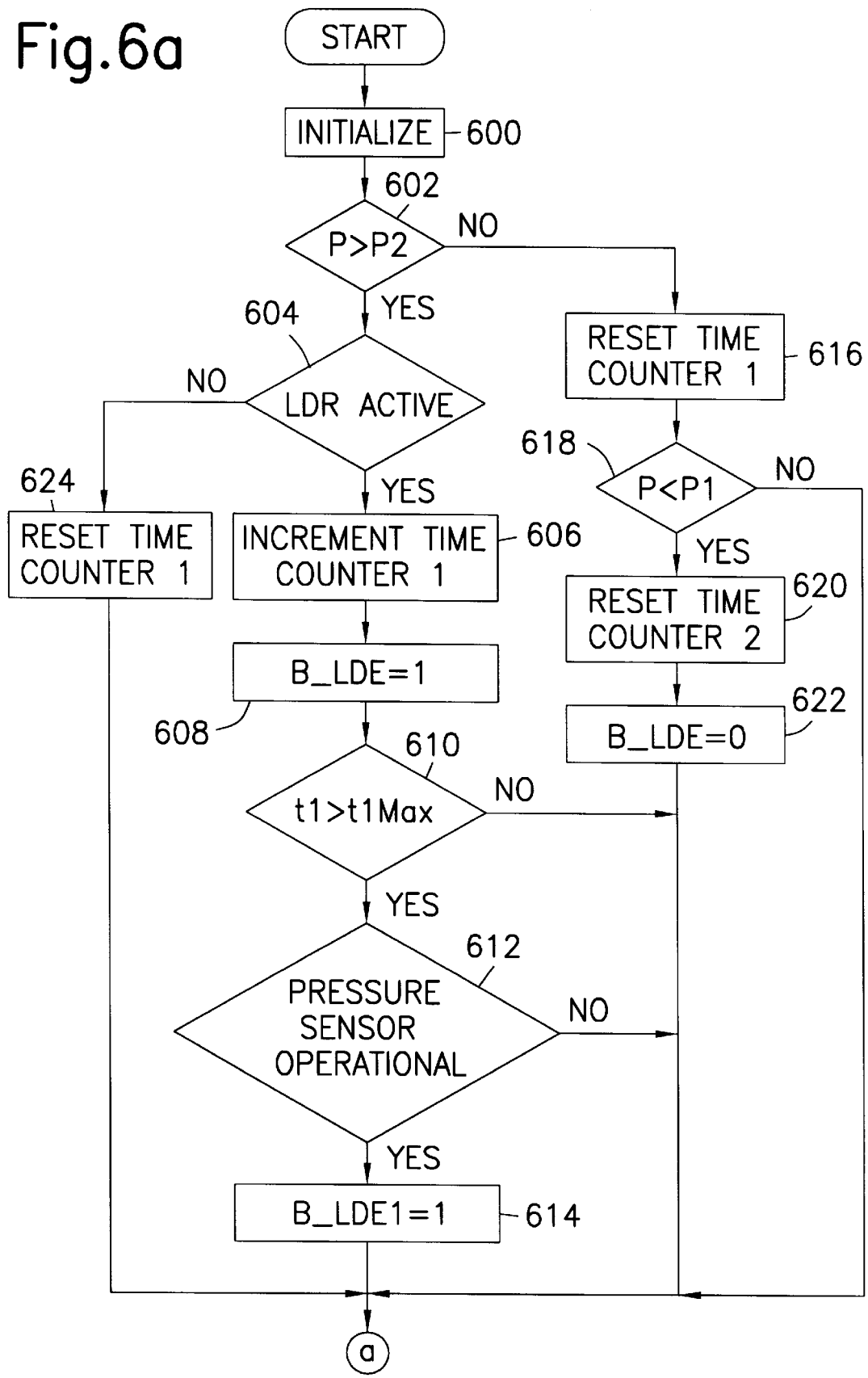
FIGS. 6a, 6b and 6c show respective portions of a flow chart of an operation of the protection system according to the present invention.
Figure 6B:
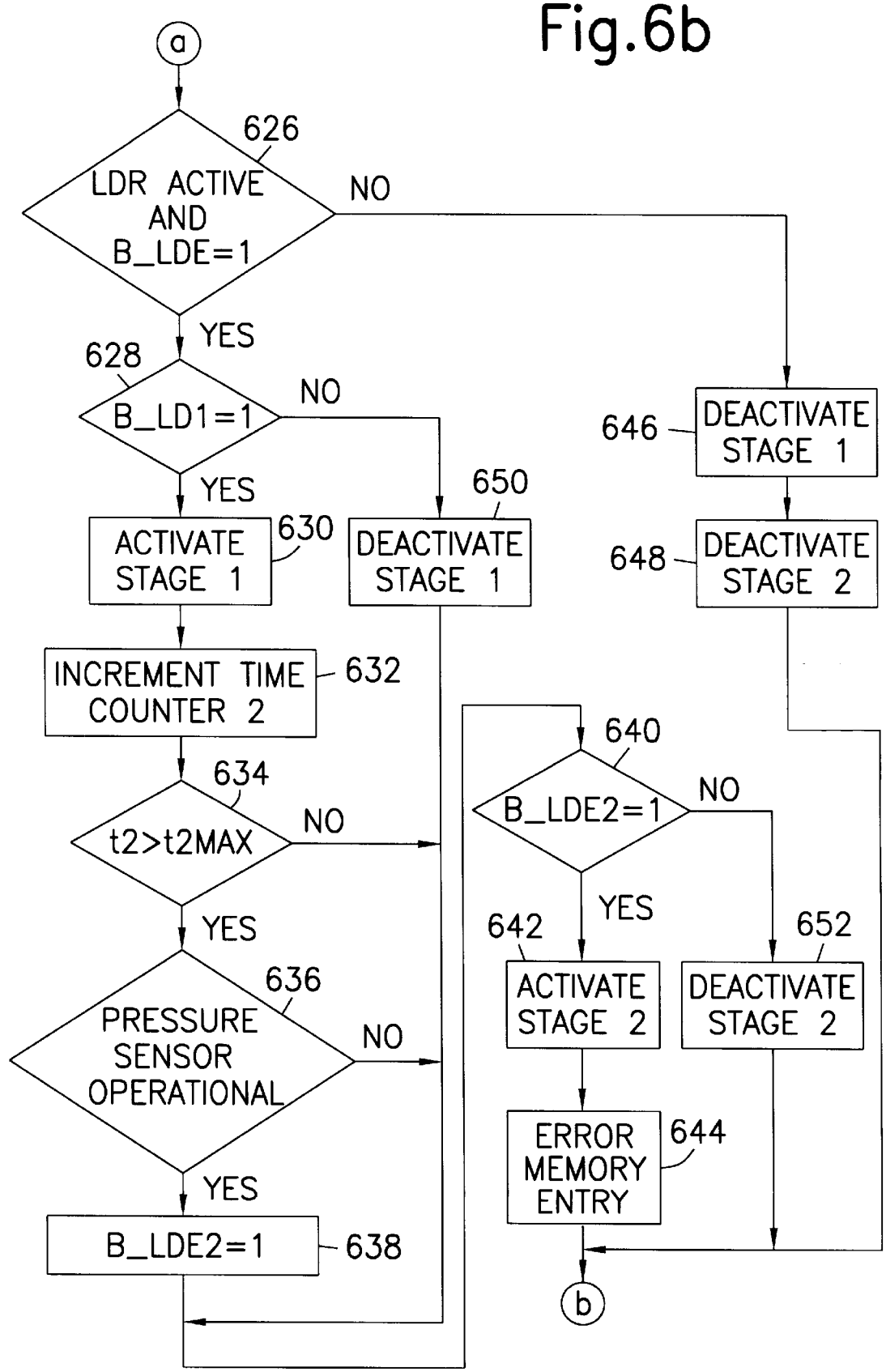
Figure 6C:
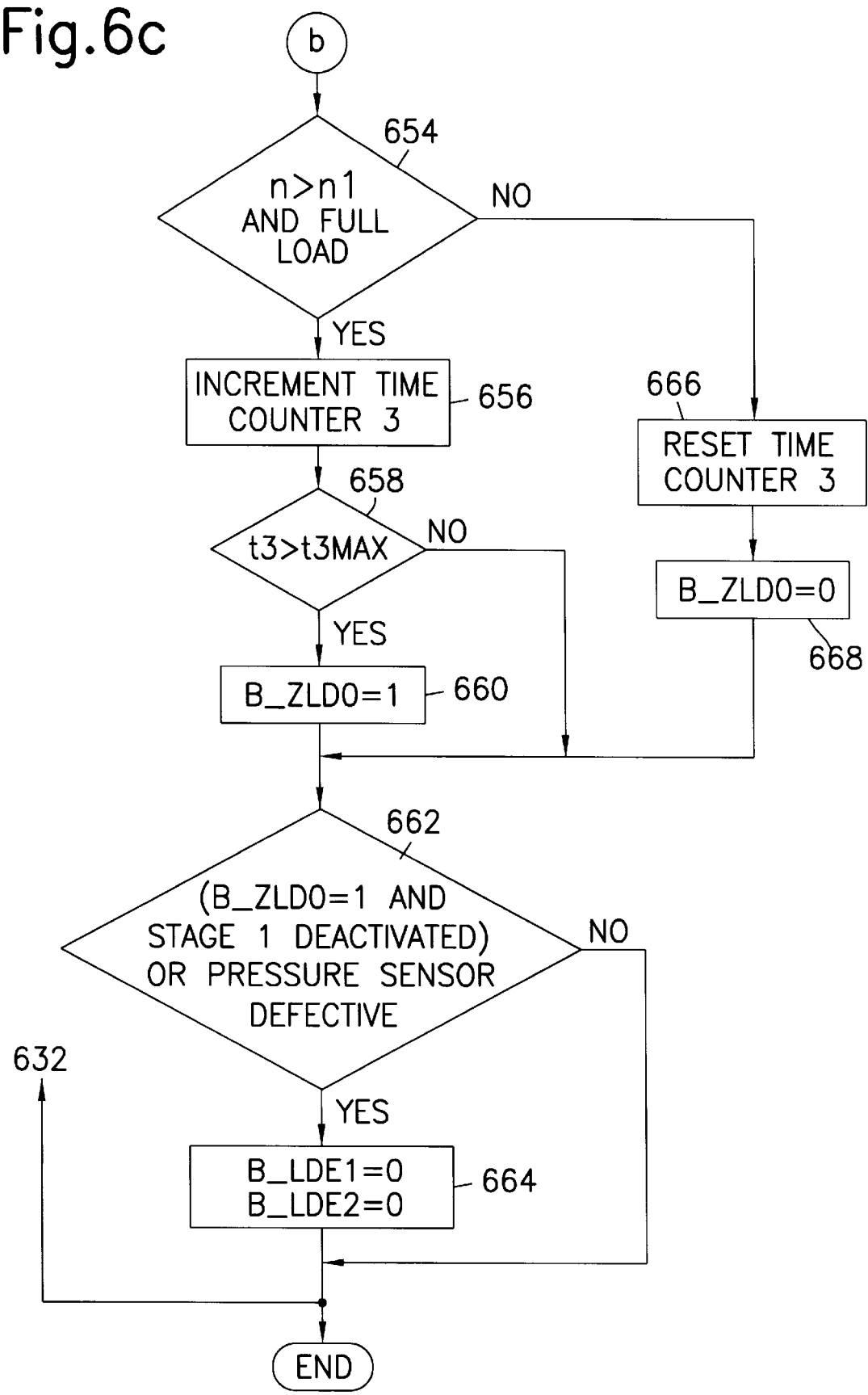

FIGS. 6a–6c show a flow chart explaining the operation of the protection system according to the present invention. The three sections of the flow chart are joined at the junction points denoted by the same letters, i.e., FIG. 6a continues at the junction point designated as a with the junction point also designated as a of FIG. 6b, and FIG. 6b continues at the junction point designated as b with the junction point also designated as b of FIG. 6c.

The section of the flow diagram illustrated in FIG. 6a starts with a step 600, in which an initialization routine is performed, where all parameters that are relevant in the course of the flow chart are assigned an initial value. At the same time, all the flags are cleared, for example. Step 600 is followed by a query 602 of whether signal P for the turbocharge pressure is greater than activation threshold value P2. Instead of signal P, another signal characterizing the turbocharging of internal combustion engine 100 can also be used. Such a signal can be formed, for example, from output signal mL of the air mass meter or air flow meter 105 and output signal n of speed sensor 124. If query 602 is answered with yes, a query 604 follows, where it is checked whether the turbocharge pressure control (LDR) is active. If query 604 is answered with yes, a time counter 1, which registers a time t1, is incremented in a subsequent step 606. Step 606 is followed by step 608, where a flag B_LDE is set. Step 608 is followed by query 610, where it is determined whether time t1 exceeds a threshold value t1Max. If this is the case, a query 612 of whether pressure sensor 112 is operational follows. If another signal is used to characterize the turbocharging instead of signal P, then query 612 checks the operating status of the sensor obtaining that signal If query 612 is answered with yes, step 614, where a flag B_LDE1 is set, follows. Step 614 is followed by a junction point designated as a with the section represented by FIG. 6b of the flow chart.

If query 602 is answered with no, step 616 is executed after query 602. Time counter 1 is reset in step 616. Step 616 is followed by query 618 of whether signal P for the turbocharge pressure is less than a deactivation threshold value P1. If query 618 is answered with yes, step 620 follows, where a time counter 2, which registers a time t2, is reset. Step 620 is followed by a step 622, where flag B_LDE is cleared. Step 622 is followed by the junction point designated as a.

If query 604 is answered with no, i.e., if the turbocharge pressure control is not active, a step 624 follows, where time counter 1 is reset. Step 624 is followed by the junction point designated as a.

If query 610 or query 612 is answered with no, the junction point designated as a follows. Query 618 is also followed by the junction point designated as a if query 618 is answered with no.

The sequence of the flow chart section illustrated in FIG. 6b begins with the junction point designated as a. This junction point is followed by a query 626, where it is checked whether the turbocharge pressure control (LDR) is active and flag B_LDE is set. If query 626 is answered with yes, a query 628 of whether flag B_LDE1 is set follows. If query 628 is answered with yes, a step 630 follows, where a stage 1 of the injection suppression is activated and the first activation condition is modified; a step 632, where time counter 2 is incremented, follows. Activating stage 1 of the injection suppression results in the interruption of fuel delivery to individual cylinders according to a predefinable suppression pattern. Step 632 is followed by query 634 of whether time t2 is greater than a threshold value t2Max. If the answer is yes, a query 636 of whether pressure sensor 112 is operational follows. If query 636 is answered with yes, a flag B_LDE2 is set in a subsequent step 638. Step 638 is followed by a query 640 of whether flag B_LDE2 is set. If it is, a step 642, where a stage 2 of the injection suppression is activated and the second activation condition is modified, follows, in turn followed by step 644, where the fact that stage 2 of the injection suppression was activated is entered in an error memory. Stage 2 of the injection suppression, like stage 1, causes fuel delivery to individual cylinders to be interrupted according to a predefinable suppression pattern with the suppression frequency being higher than in stage 1. Step 644 is followed by the junction point of the flow chart designated as b.

If query 626 is answered with no, a step 646 follows, where stage 1 of the injection suppression is deactivated, i.e., unlimited injection is allowed to continue. Step 646 is followed by step 648, where stage 2 of the injection suppression is deactivated. Step 648 is followed by a junction point designated as b.

If query 628 is answered with no, a step 650 follows, where stage 1 of the injection suppression is deactivated. After step 650, the flow chart continues with query 640.

The flow chart continues with query 640 even if query 634 or query 636 is answered with no. If query 640 is answered with no, it is followed by a step 652, where stage 2 of the injection suppression is deactivated. Step 652 is followed by the junction point designated as b.

The flow chart section represented by FIG. 6c begins with the junction point designated as b, where the section represented by FIG. 6b ends. Junction point b is followed by query 654 of whether speed signal n is greater than a threshold value in and whether internal combustion engine 100 is under full load. It can be determined, for example, from the angle of aperture signal α of throttle valve 107 or the status of a full load switch whether a full load condition exists. If query 654 is answered with yes, a time counter 3, which registers a time t3, is incremented in a subsequent step 656. Step 656 is followed by a query 658 of whether time t3 is greater than a predefinable threshold value t3Max. If query 658 is answered with yes, it is followed by a step 660, where flag B_ZLDO is set. Step 660 is followed by query 662 of whether flag B_ZLDO is set and stage 1 of the injection suppression is deactivated or whether pressure sensor 112 is defective. If query 662 is answered with yes, it is followed by step 664, where flags B_LDE1 and B_LDE2 are cleared. The flow chart ends with step 664.

If query 654 is answered with no, step 666 follows, where time counter 3 is reset. Step 666 is followed by step 668, where flag B_ZLDO is cleared. After step 668, the flow chart continues with query 662. One also arrives at query 662 if query 658 is answered with no. If query 662 is answered with no, the flow chart comes to an end. After the end of the flow chart run, a new run is begun. The initialization routines of step 600, however, are only performed in the first run of a cycle, i.e., a repeat run of the flow chart will start with step 602.

The variation of turbocharge pressure signal P can be derived from the following flow chart executions:

If it is the first run execution since the start of the internal combustion engine 100, step 600 is executed first. Signal P for the turbocharge pressure is initially smaller than activation threshold value P2, so that query 602 is answered with no, and thus step 616 is executed next. Since turbocharge pressure signal P is initially also smaller than the deactivation threshold value, query 618 is answered with yes and steps 620 and 622 follow. Since step 608 has not yet been executed, query 626 is answered with no, so that steps 646 and 648 are executed. The run through the rest of the flow chart to its end (see FIG. 6c) is not relevant for the variation of turbocharge pressure signal P illustrated in FIG. 2, so it is not explained in detail here.

The above execution through the flow chart is repeated until turbocharge pressure signal P exceeds deactivation threshold value P1. From this point on, steps 620 and 622 are omitted, while the rest of the flow chart is executed as above.

A drastic change occurs starting at time tp1 when signal P exceeds activation threshold value P2. The query 604 is executed, time counter 1 is incremented in step 606, and flag B_LDE is set in step 608. This is repeated until query 610 is answered with yes. Thus the activation condition for stage 1 injection suppression is met. Query 610 is answered with yes starting at time tp2 shown in FIG. 2. Then flag B_LDE1 is set in step 614 and both queries 626 and 628 are answered with yes, so that step 630, activating stage 1 of the injection suppression, is executed. Setting flag B_LDE1 in step 614 results in the first activation condition being modified so that no waiting occurs during time interval t1Max. Subsequently step 632, where time 2 is incremented, is executed. Query 634 is answered with no, so that stage 2 of the injection suppression is not activated. In order for query 634 to be answered with yes, time counter 2 must exceed time interval t2Max. Time counter 2 (see step 632), however, has stopped incrementing, since turbocharge pressure signal P has dropped below deactivation threshold value Pi. Thus query 618 is answered with yes, and flag B_LDE is cleared in step 622. As a result, query 626 is answered with no, and step 632 is not executed. Instead, step 646 is executed among others, i.e., the injection suppression of stage 1 is deactivated. In addition, time counter 3 is set high by repeatedly executing step 656 and subsequently, in step 664, the first activation condition is reset by clearing flag B_LDE1.

When signal P varies as illustrated in FIG. 3, the flow chart is run through as indicated above up to point tp2. In contrast to FIG. 2, time counter 2 does not stop incrementing before time tp3 is reached, since signal P is still above the deactivation threshold value P1 at time tp3. Therefore query 634 is answered with yes and, if pressure sensor 112 is operational, flag B_LDE2 is set in step 638. Thus query 640 is also answered with yes, and stage 2 of the injection suppression is activated in step 642. Simultaneously with the activation of stage 2, the deactivation threshold value P1 is lowered. As a result of setting flag B_LDE2, the second activation condition is modified so that no more waiting takes place during time interval t2Max.

In FIG. 4, signal P initially remains below the deactivation threshold value Pi, so that step 622 is executed when running through the flow chart, i.e. flag B_LDE is cleared. Due to query 626, however, the injection suppression can only be activated when flag B_LDE is set. Flag B_LDE is set at time tp4. At this time, signal P exceeds activation threshold value P2. Thus query 602 is answered with yes and, if the turbocharge pressure control is active, step 608, setting flag B_LDE, is executed among other things. As no waiting occurs during time intervals t1Max and t2Max due to the previous steps (see above), i.e., flags B_LDE1 and B_LDE2 are set, steps 626 through 634 and 640 through 644 are executed after step 610, i.e., stage 2 of the injection suppression is activated among other things.

In addition to the variation of signal P as shown in FIGS. 2 through 4, other variations are also possible. For example, signal P can vary so that the changes in the activation conditions are canceled. This corresponds to a run through the section represented in FIG. 6c of the flow diagram from step 654 through step 662, where all the queries are answered with yes, i.e., the internal combustion engine 100 is operated at full load, above the speed threshold in, and with stage 1 of the injection suppression deactivated at least during a time t3Max. Then flags B_LDE1 and B_LDE2 are cleared in step 664.

In another embodiment of the present invention, the first and second suppression patterns are selected so that the first and second suppression patterns involve all cylinders of the internal combustion engine at least once after a number of operating cycles that is predefinable separately for each suppression pattern.

In a variant of the present invention, the injection is influenced through the throttle valve position, i.e., through the amount of air supplied to the internal combustion engine 100 instead of suppressing injection into individual cylinders. The air supply is reduced by reducing the aperture angle α of throttle valve 107 using drive 109, which is actuated in a suitable manner. Thus turbocharging of internal combustion engine 100 is effectively reduced, while the principle of the process according to the present invention remains unmodified. Only the first and second suppression patterns are replaced with two interventions of different intensities in the throttle valve position.

What is claimed is:

1. A protection system for a turbocharged internal combustion engine having a plurality of cylinders, comprising:
a controller suppressing an injection into at least one of the plurality of cylinders, the injection being suppressed as a function of a first predetermined suppression pattern if a turbocharging parameter meets a first predetermined activation condition, the injection being suppressed as a function of a second predetermined suppression pattern if the turbocharging parameter meets a second predetermined activation condition,
wherein one of the first predetermined activation condition and the second predetermined activation condition is modified by the controller if the one of the first predetermined activation condition and the second predetermined activation condition occurs at least once.

2. The protection system according to claim 1, wherein the first predetermined activation condition includes the turbocharging parameter that exceeds a predetermined activation threshold value for at least a first predetermined time interval.

3. The protection system according to claim 2, wherein the second predetermined activation condition includes the turbocharging parameter that exceeds a predetermined deactivation threshold value for at least a second predetermined time interval after the first predetermined time interval expires.

4. The protection system according to claim 2, wherein the first predetermined activation condition is modified to quicker activate a suppression of the injection when the first predetermined activation condition occurs at least once.

5. The protection system according to claim 4, wherein the first predetermined time interval has a length of zero when the first predetermined activation condition is modified.

6. The protection system according to claim 3, wherein the second predetermined activation condition is modified to quicker activate a suppression of the injection when the second predetermined activation condition occurs at least once.

7. The protection system according to claim 6, wherein the second predetermined time interval has a length of zero when the second predetermined activation condition is modified.

8. The protection system according to claim 1, wherein one of the first and second predetermined suppression patterns is deactivated again if a respective one of first and second predetermined deactivation conditions is met.

9. The protection system according to claim 8, wherein at least one of the first and second predetermined deactivation conditions includes the turbocharging parameter that falls below a predetermined deactivation threshold value, the predetermined deactivation threshold value being determined as a function of activating one of the first and second predetermined suppression patterns.

10. The protection system according to claim 4, wherein a modification of the first predetermined activation condition is cancelable if a reset condition is met.

11. The protection system according to claim 10, wherein the reset condition includes a predetermined engine condition, the predetermined engine condition being set when the internal combustion engine operates at a speed above an operating threshold value and under a full load for at least a third predetermined time interval, the predetermined engine condition being set when the turbocharging parameter is below a predetermined deactivation threshold value, the predetermined deactivation threshold value being dependent on the first predetermined suppression pattern.

12. The protection system according to claim 6, wherein a modification of the second predetermined activation condition is cancelable if a reset condition is met.

13. The protection system according to claim 12, wherein the reset condition includes a predetermined engine condition, the predetermined engine condition being set when the internal combustion engine operates at a speed above an operating threshold value and under a full load for at least a third predetermined time interval, the predetermined engine condition being set when the turbocharging parameter is below a predetermined deactivation threshold value, the predetermined deactivation threshold value being dependent on the second predetermined suppression pattern.

14. The protection system according to claim 1, wherein the first and second predetermined suppression patterns affect all of the plurality of cylinders at least once after a predetermined number of operating cycles, the predetermined number of operating cycles being separately determined for each of the first and second predetermined suppression patterns.

* * * * *

UNITED STATES PATENT AND TRADEMARK OFFICE
CERTIFICATE OF CORRECTION

PATENT NO. : 5,913,301

DATED : June 22, 1999

INVENTOR(S) : Karin Kienle and Michael Baeuerle

It is certified that error appears in the above-identified patent and that said Letters Patent is hereby corrected as shown below:

Column 4, line 34, "in" should be -- n1 --;

Column 6, line 31, "in" should be -- n1 --;

Column 8, line 2, "in" should be -- n1 --;

Column 7, line 27, "Pi" should be -- P1 --; and

Column 7, line 49, "Pi" should be -- P1 --.

Signed and Sealed this

Eleventh Day of July, 2000

Attest:

Q. TODD DICKINSON

*Attesting Officer*     *Director of Patents and Trademarks*